United States Patent [19] [11] 3,777,120
Menger et al. [45] Dec. 4, 1973

[54] DEVICE FOR SELECTIVELY PASSING AND BLOCKING SHEETS OF PLANAR MATERIAL DEPENDING UPON THE ORIENTATION THEREOF

[75] Inventors: Joe L. Menger; Bryce G. Thornton, both of Mentor, Ohio

[73] Assignee: Addressograph-Multigraph Corporation, Cleveland, Ohio

[22] Filed: June 23, 1972

[21] Appl. No.: 265,852

[52] U.S. Cl. .......... 235/61.11 R
[51] Int. Cl. .......... G06k 13/06
[58] Field of Search .......... 235/61.11 R, 61.11 A, 235/61.11 B, 61.11 C, 61.7 B; 340/149 A; 200/46

[56] References Cited
UNITED STATES PATENTS

| | | | |
|---|---|---|---|
| 3,371,193 | 2/1968 | Reynolds et al. | 235/61.11 A |
| 3,511,975 | 5/1970 | Blair et al. | 235/61.11 A |
| 3,513,299 | 5/1970 | Loose | 235/61.11 A |
| 3,632,991 | 1/1972 | Brinning | 235/61.11 B |

*Primary Examiner*—Daryl W. Cook
*Attorney*—Russell L. Root et al.

[57] ABSTRACT

A device for selectively passing or blocking credit cards introduced into a reading mechanism, passing the credit card for entry when, and only when, the card is oriented in a given position. The credit card has one corner thereof cut at a 45° angle. A pin is provided on the path of the credit card to coact with the corner of a leading edge thereof. The pin has a sloping angled surface which will coact with the angled cut of the card and allow the pin to be depressed and pass the card thereby when the angled cut corner strikes the pin signifying proper orientation; the pin also has a vertical blocking surface which will block passage of the card by engaging any other corner of the card signifying improper orientation thereof.

4 Claims, 4 Drawing Figures

DEVICE FOR SELECTIVELY PASSING AND BLOCKING SHEETS OF PLANAR MATERIAL DEPENDING UPON THE ORIENTATION THEREOF

BACKGROUND OF THE INVENTION

This invention relates generally to devices for selectively passing or blocking sheets of planar material responsive to a sensed corner condition, and more particularly to a device for selectively blocking or passing plastic credit cards which have one corner thereof with an angled corner cut, the passing being only with the given corner cut being orientated properly.

In many cases it is desirable to selectively pass or block a sheet of planar material depending upon the orientation thereof. In one specific instance, which is the specific application for which this present invention is intended, it is necessary to deliver a plastic credit card to a card reading head with the credit card oriented in a specific given position so that the indicia, in the form of bar code on the credit card will be read properly.

In the past it has been common practice to provide the credit cards with three corners being square or slightly rounded and the fourth corner cut at a 45° angle. The angle cut acts as a guide for the operator for properly orienting the credit card for introduction to the reading head. The operator can see and/or feel the position of the 45° corner cut and introduce the card properly oriented to the reading head. This system is adequate so long as the operator is trained in the proper orientation of the card and remains constantly aware of the orientation of each card as it is being delivered to the machine. However, because of inadequately trained operators or because of operator carelessness or unawareness, occasionally a card may be delivered improperly into the device. This can result in the device improperly reading the indicia or even in a malfunctioning of the device which would require the device to be dismantled and the improperly entered card removed. In either case an improperly fed card is something that should be avoided in order to prevent incorrect information being read or to prevent time-consuming delays.

SUMMARY OF THE INVENTION

According to the present invention a device is provided for sensing the orientation of and selectively passing or blocking sheets of planar material having a multiplicity of corners responsive to a sensed corner condition of the sheets, wherein one of the corners of each of the sheets has a configuration substantially different from that of the other corners. When the one configuration is sensed as properly oriented the sheet is allowed to pass, and when improperly oriented this condition is sensed and the sheet is blocked. In the preferred embodiment, the special corner configuration is an angled cut; however other embodiments could include notches, or apertures located in the specific quadrant of one corner which the broad term "corner configuration" is intended to include.

DESCRIPTION OF THE PREFERRED EMBODIMENT

Figure 1:
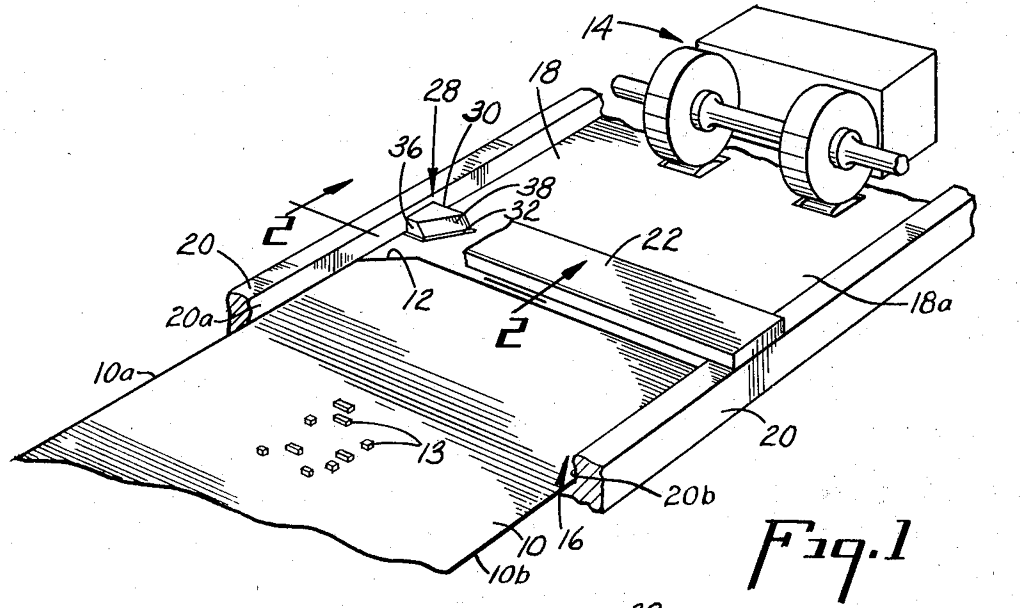
FIG. 1 is a perspective view of a device for sensing and selectively passing sheets of planar materials having a given corner configuration in one corner which one corner is properly oriented for passing.

Referring now to the drawing, a device for selectively passing or blocking sheets of planar material is shown. The device will be described in an embodiment specifically designed for use in sensing and selectively passing plastic credit cards each of which credit cards has one corner cut at about a 45° angle and the other three corners square cut or slightly rounded when and only when the 45° corner cut is oriented in a specific configuration. A plastic credit card of this kind is shown and designated by a reference character 10 with the 45° angle cut being shown in one corner at 12. The device is specifically designed to read an embossed bar code which is shown on the card and designated by the reference character 13. A bar code reading head 14 is shown incorporated in the device. The reading head does not per se constitute any part of the invention.

The device includes an entry chute 16 comprised of a base 18, a pair of side guides 20 and a hold-down bar 22. The base and side guides 20 define the chute which is adapted to receive the credit card 10 and allow it to slide therein. The side guides 20 have parallel side surfaces *20a* and *20b* which engage side edge portions *10a* and *10b* of the credit card 10. The base 18 has a surface *18a* which engages a face surface of the credit card.

A sheet sensing mechanism is provided and designated generally with the reference character 28. This sheet sensing mechanism includes a generally rectangular pin 30. The pin 30 extends through a correspondingly shaped opening 32 in the base 18 and into a pin retainer 33 which has a correspondingly shaped aperture 34. A compression spring 35 is disposed within the pin retainer in engagement with the pin 30 normally biasing the pin 30 upwardly into contact with the hold-down bar 22. The pin 30 is thus positioned in the path of travel of the card 10 within the chute 16.

Figure 2:
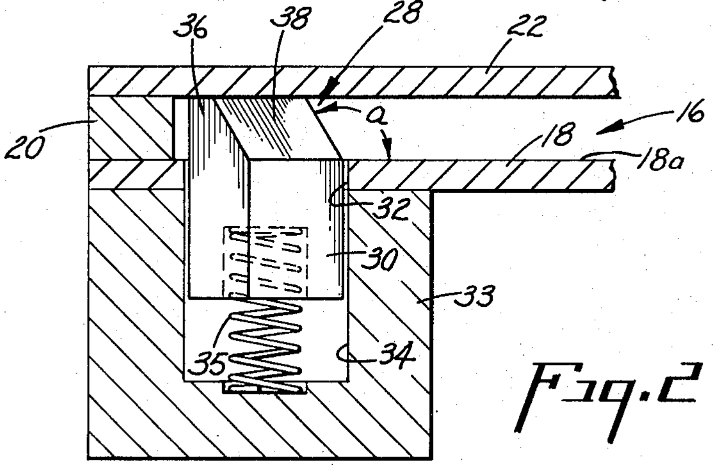
FIG. 2 is an enlarged sectional view taken substantially along the plane designated by the line 2—2 of FIG. 1.

The pin 30 has a forwardly disposed vertically extending stop surface 36 and an angularly disposed sloping camming surface 38. The camming surface 38 slopes upwardly from the base 18 at an angle *a* shown in FIG. 2. Preferably this slope is at an angle of about 125°. The camming surface 38 intersects the base 18 at an angle *b* with respect to the path of travel shown in FIG. 3. Angle *b* should be substantially the same angle as the angle of the corner cut 12 with respect to the path of travel of the card which preferably is about 45°.

OPERATION

Basically the device of the present invention operates by the credit card depressing the pin 30 when and only when the 45° corner cut 12 is oriented at the forward edge and to the left as viewed in FIG. 1. With any other orientation of the credit card the pin 30 will not be depressed and will block the passage of the credit card.

This passage or blocking is accomplished essentially in the following manner. If the operator grasps the card and inserts it in the chute essentially as shown in FIG.

Figure 3:
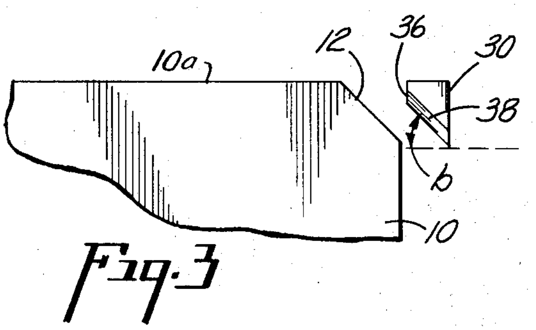
FIG. 3 is a plan view of a portion of the device showing a sheet of the material approaching in a proper orientation for passing.

1, with the 45° cut corner on the forward edge and directed to the left, the 45 degree cut of the card will approach the pin 30 essentially as shown in FIG. 3. This will bring the 45° cut corner 12 into engagement with the sloping camming surface 38. Continued pressure of the thrust of the card 10 against the camming surface 38 will tend to raise the card up the camming surface 38. However, the card will come into contact with the hold-down bar 22 so that it is restrained from raising any further from the base 18. Thereafter any further force exerted by the 45° cut 12 against the camming surface because of the angled and sloping configuration of the camming surface 38 will be vectored in such a way to cause the card to press the pin 30 down into the aperture 34 in the pin retainer 33. This will allow the card 10 to pass over the pin 30 with the pin being depressed into the pin retainer 33. Thus with the card 10 oriented with the 45° cut 12 in the forward left hand corner the sheet sensing mechanism 28 will allow the card to pass to the reading head 14 which will read and expell the card.

Figure 4:
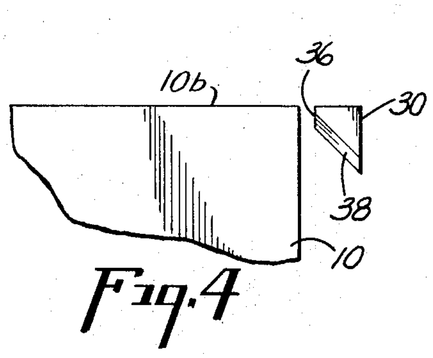
FIG. 4 is a view similar to FIG. 3 showing a sheet of material improperly oriented for passing.

If the card is entered in a position where any one of the other three corners beside that having the forty-five degree cut is in the forward edge left-hand position, the card will approach the pin 30 in the configuration shown in FIG. 4. With this configuration the front edge of the card 10 will strike against the vertical stop surface 36. Since this surface is vertical and not sloping the surface will act as an abutment and the pin 30 will not be depressed by pressure exerted by the card but will actually form a barrier or a stop preventing further movement of the card 10. Hence, this is a positive deterrent and a positive sign to the operator that the card is improperly oriented and cannot be inserted this way thus requiring the operator to withdraw the card and reinsert it in the proper manner.

The device of the present invention has been described as it is used in conjunction with a hand-fed credit card reading head. However, it is to be understood that its use is not so limited. For example, it could be incorporated in a conveyor fed device, and indeed other devices where a proper orientation of a sheet of material is required for entrance.

We claim:

1. An apparatus for receiving in a predetermined orientation a card having face surfaces extending between a pair of parallel side edge portions which are connected with a leading edge portion at a first corner and at a second corner which includes a transverse edge portion extending between one of the side edge portions and the leading edge portion, said apparatus comprising first guide means for guiding movement of the card along a main path from a first position toward a second position, said guide means including first surface means for engaging the one side edge portion of the card when the card is in the predetermined orientation, second surface means for engaging the other side edge portion of the card when the card is in the predetermined orientation and third surface means connected with said first and second surface means for engaging a face surface of the card, said third surface means being disposed in a plane extending perpendicular to said first and second surface means, and sensing means for blocking movement of the card along the main path when the card is in an orientation other than the predetermined orientation and for permitting movement of the card along the main path when the card is in the predetermined orientation, said sensing means including a member movable transversely to the plane of said third surface means, said member being movable between an extended position in which said member extends through the plane of said third surface means into the path of movement of the card and a retracted position in which the member is disposed to one side of the path of movement of the card, second guide means for guiding movement of said member from the extended position to the retracted position along a second path extending transversely to the plane of said third surface means, biasing means for urging said member to the extended position, stop surface means disposed on said member and extending transversely to said second and third surface means for engaging the leading edge portion of the card and blocking movement of the card along the main path when the card is in an orientation other than the predetermined orientation, and cam surface means disposed on said member for coacting with the card when it is in the predetermined orientation to effect movement of said member along the second path to the retracted position under the influence of forces applied to said cam surface means by the card, said cam surface means being disposed in a plane which intersects the plane of said third surface means at an obtuse angle which opens toward the leading edge portion of the card in such a manner that said cam surface means slopes away from said third surface means in the direction of travel of the card along said main path so that forces applied to said cam surface means by the card when it is in the predetermined orientation cause said member to move along said second path to the retracted position.

2. An apparatus as set forth in claim 1 wherein said sensing means further includes an end surface disposed on said member for engaging the face surface of the card to maintain said member in the retracted position against the influence of said biasing means when the card is in the second position.

3. An apparatus as set forth in claim 1 wherein said cam surface means is disposed in a flat plane having an axis extending parallel to said third surface means and the transverse edge portion of the card when the card is in the predetermined orientation.

4. An apparatus as set forth in claim 1 wherein said second guide means includes a plurality of surfaces which partially define a cavity, said biasing means including a spring member disposed in the cavity.

* * * * *